US010293637B2

(12) United States Patent
Logan

(10) Patent No.: US 10,293,637 B2
(45) Date of Patent: May 21, 2019

(54) BICYCLE QUICK RELEASE CAM LEVER WITH BIASED CLOSURE

(71) Applicant: Burley Design LLC, Eugene, OR (US)

(72) Inventor: Patrick Logan, Eugene, OR (US)

(73) Assignee: Burley Design LLC, Eugene, OR (US)

( * ) Notice: Subject to any disclaimer, the term of this patent is extended or adjusted under 35 U.S.C. 154(b) by 467 days.

(21) Appl. No.: 15/052,719

(22) Filed: Feb. 24, 2016

(65) Prior Publication Data

US 2016/0339740 A1 Nov. 24, 2016

Related U.S. Application Data

(60) Provisional application No. 62/164,925, filed on May 21, 2015, provisional application No. 62/205,546, filed on Aug. 14, 2015.

(51) Int. Cl.
*B60B 27/02* (2006.01)
*B62K 25/02* (2006.01)
(52) U.S. Cl.
CPC ............ *B60B 27/026* (2013.01); *B62K 25/02* (2013.01); *B62K 2206/00* (2013.01)
(58) Field of Classification Search
CPC ..... B60B 27/023; B60B 27/026; B62K 25/02; B62K 25/04; B62K 2025/025; B62K 2206/00
See application file for complete search history.

(56) References Cited

U.S. PATENT DOCUMENTS

| 4,079,958 | A  | 3/1978  | Segawa           |
|-----------|----|---------|------------------|
| 5,135,330 | A  | 8/1992  | Chen et al.      |
| 5,673,925 | A  | 10/1997 | Stewart          |
| 6,260,931 | B1 | 7/2001  | Stewart          |
| 6,742,849 | B1 | 6/2004  | Denby            |
| 6,761,417 | B2 | 7/2004  | Denby            |
| 7,523,998 | B2 | 4/2009  | Yu               |
| 7,530,645 | B2 | 5/2009  | Takachi          |
| 7,661,767 | B2 | 2/2010  | Montague et al.  |
| 7,673,947 | B2 | 3/2010  | Chang            |
| 7,722,129 | B2 | 5/2010  | Cusack           |
| 7,954,906 | B2 | 6/2011  | Montague et al.  |
| 8,056,987 | B2 | 11/2011 | Cusack           |
| 8,075,065 | B2 | 12/2011 | Mercat et al.    |

(Continued)

OTHER PUBLICATIONS

International Search Report and Written Opinion dated Aug. 18, 2016, issued by the United States International Search Authority in corresponding International Application No. PCT/US2016/032773, filed May 16, 2016.

*Primary Examiner* — Jason R Bellinger
(74) *Attorney, Agent, or Firm* — Klarquist Sparkman, LLP

(57) ABSTRACT

A quick release skewer assembly for use in mounting a wheel to wheel supporting fork includes a camming lever that is pivotally coupled to the skewer for pivoting relative to the skewer between lever closed and lever open positions. With the skewer properly tightened on the fork, pivoting the lever to the lever closed position clamps the wheel to the fork with a clamping force. A biasing member coupled to the skewer and to the fork applies a biasing force that biases the lever toward the lever open position. When the skewer is insufficiently tightened, the biasing force moves the lever to a bias rest position between the lever closed and open positions. The positioning of the lever in the bias rest position provides a visual alert to an individual using a vehicle, such as a bicycle, that the wheel is insufficiently tightened.

19 Claims, 16 Drawing Sheets

(56) References Cited

U.S. PATENT DOCUMENTS

| | | |
|---|---|---|
| 8,573,878 B2 | 11/2013 | Chang |
| 8,820,854 B2 | 9/2014 | Howes |
| 8,905,492 B2 | 12/2014 | Normand et al. |
| 2004/0046353 A1 | 3/2004 | Neugent |
| 2009/0261648 A1 | 10/2009 | Cusack |
| 2012/0032499 A1 | 2/2012 | Ashman |
| 2013/0334871 A1 | 12/2013 | Chang |
| 2014/0062175 A1 | 3/2014 | Montague et al. |
| 2014/0265227 A1 | 9/2014 | Voss |

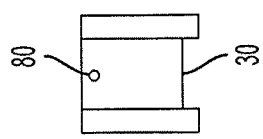
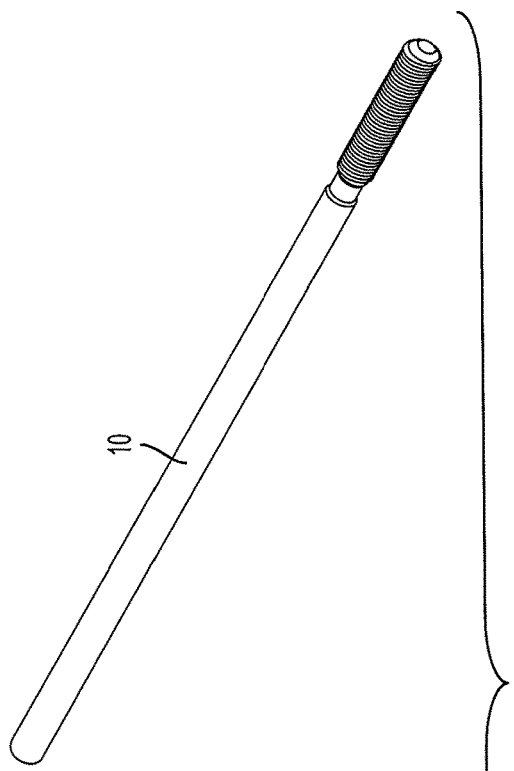
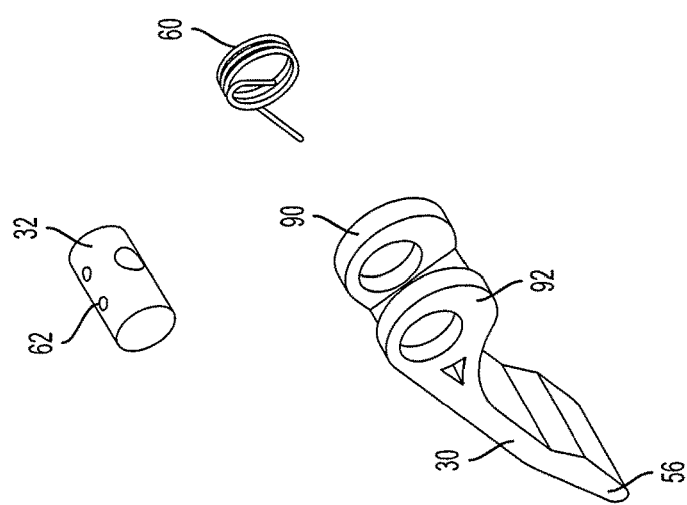

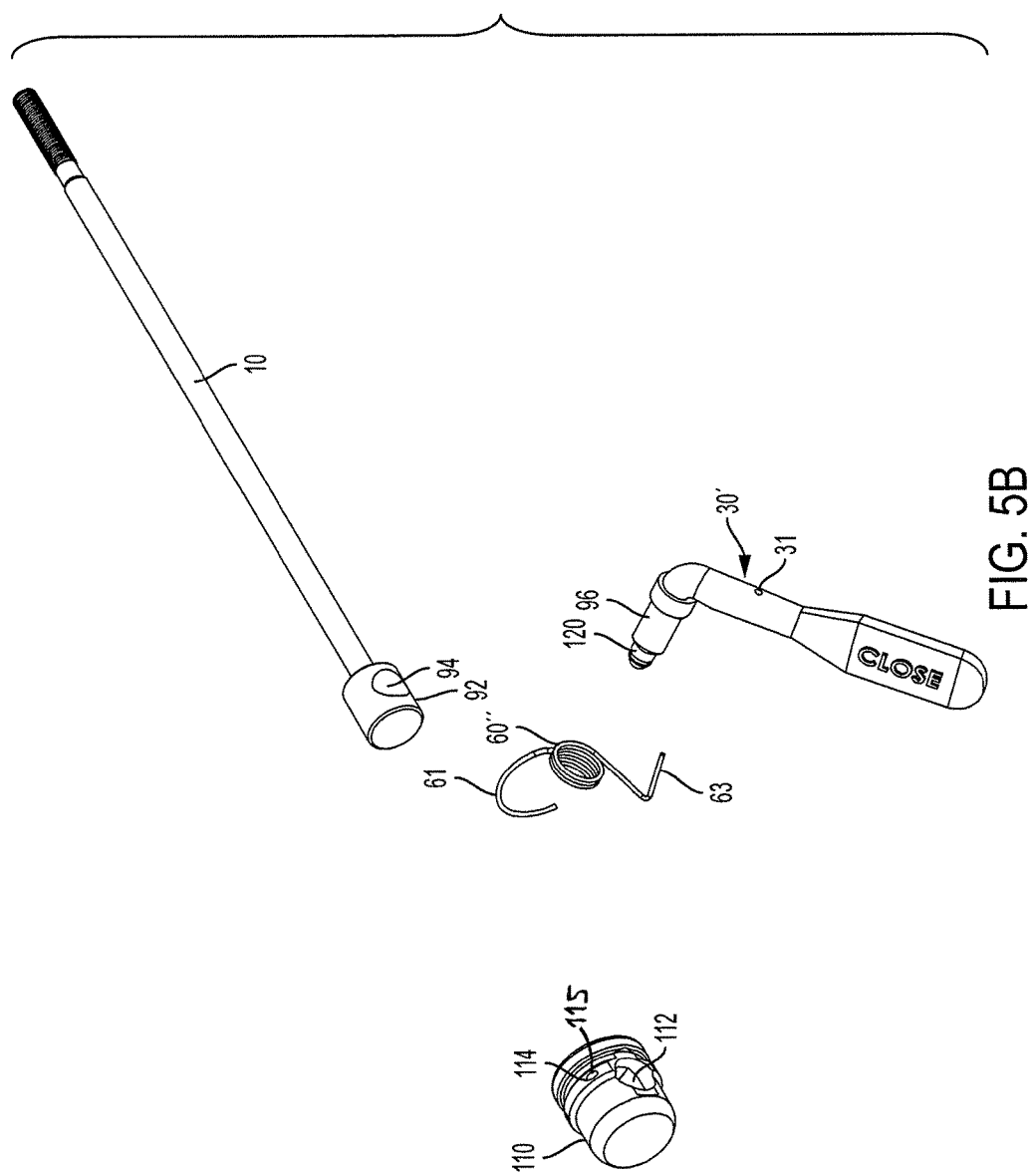

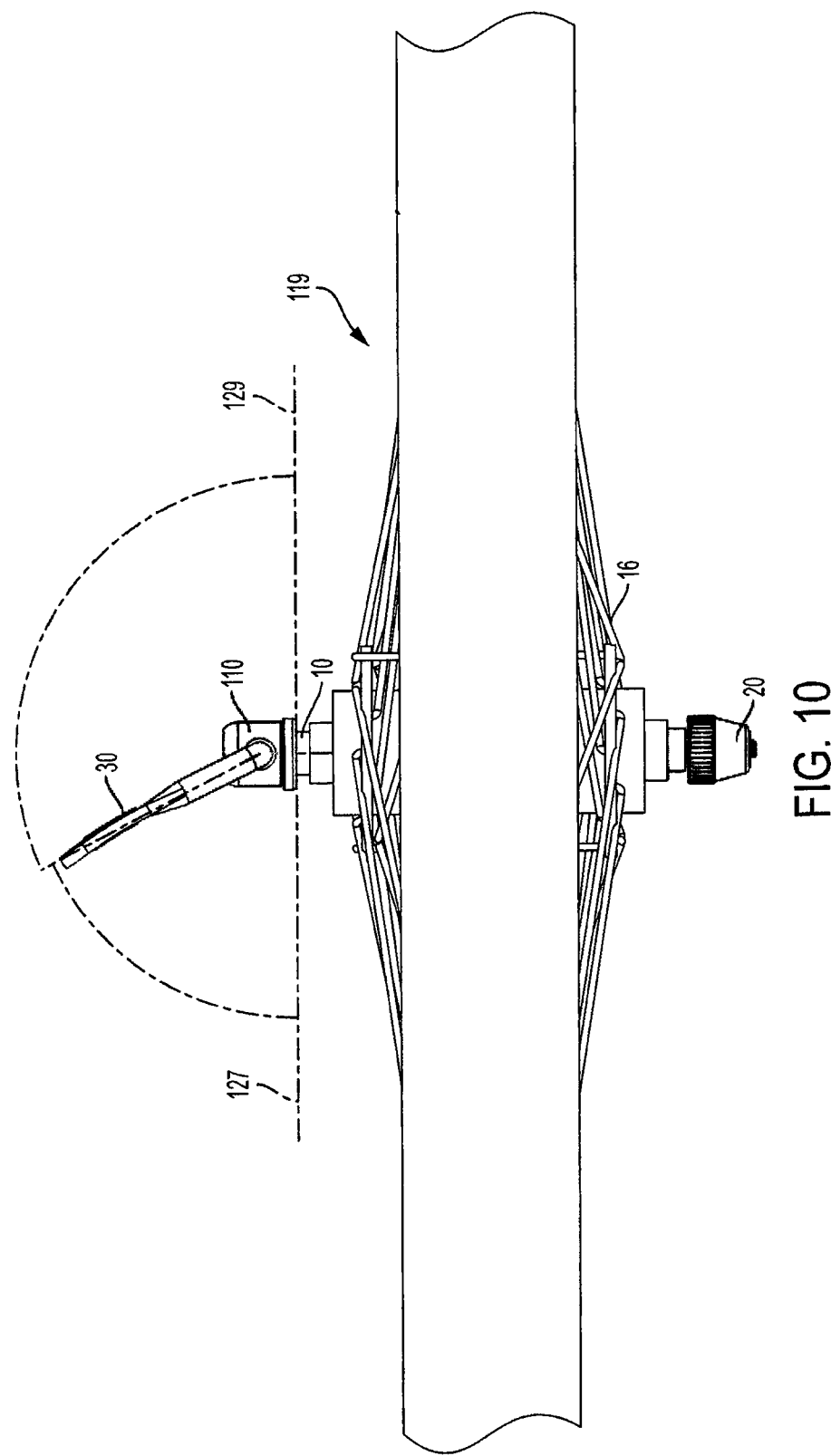

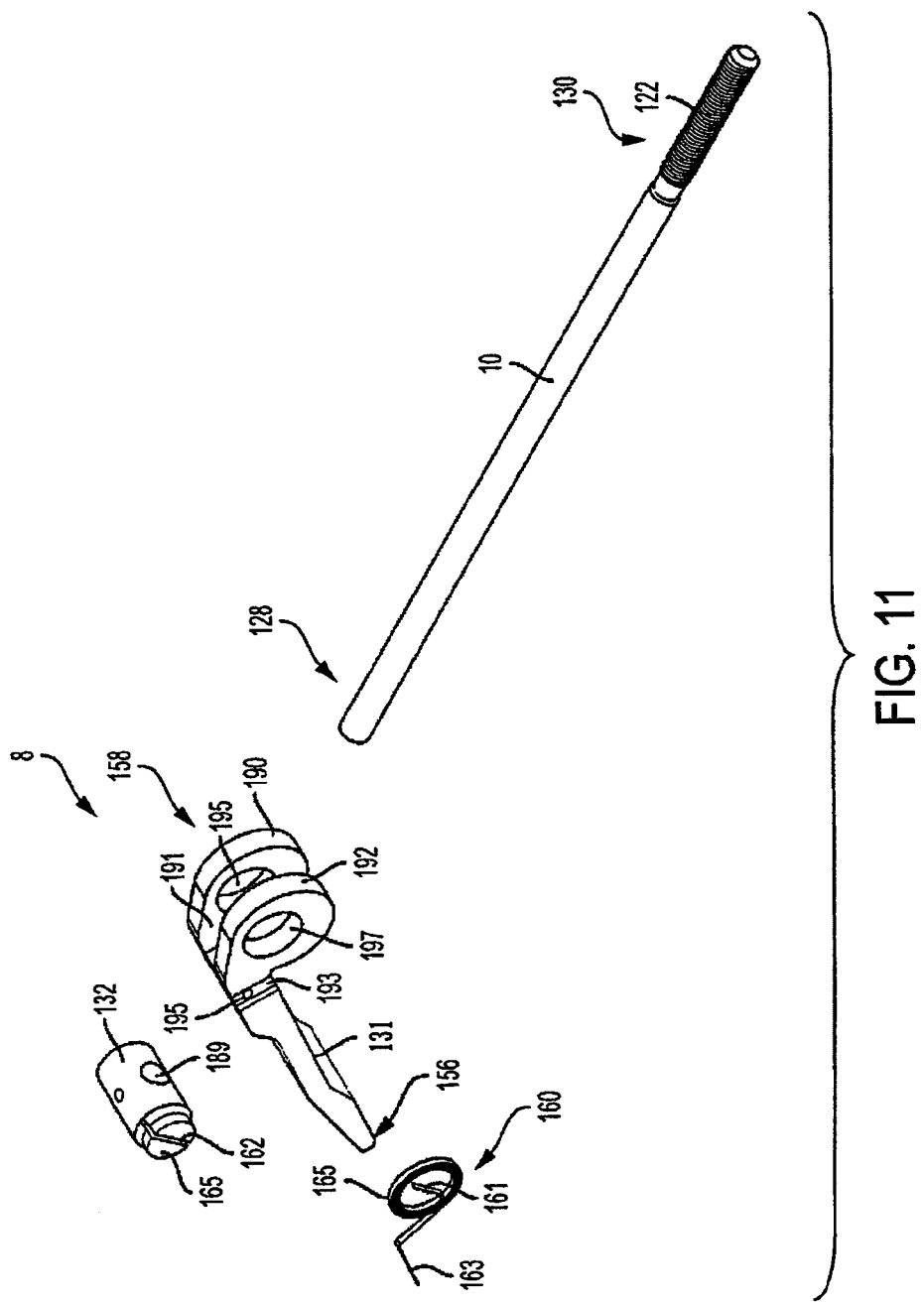

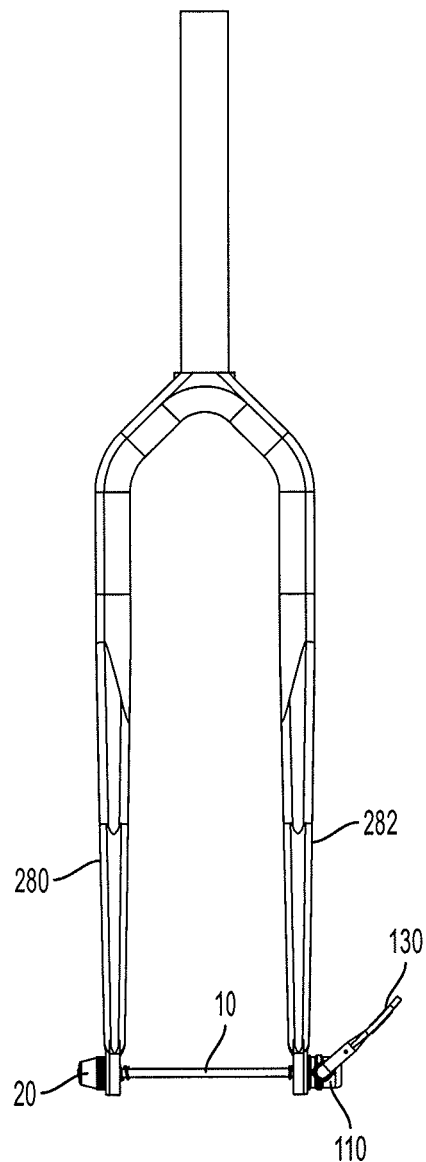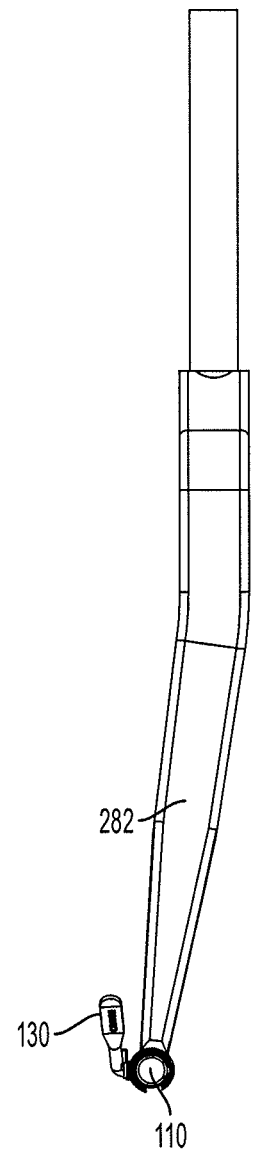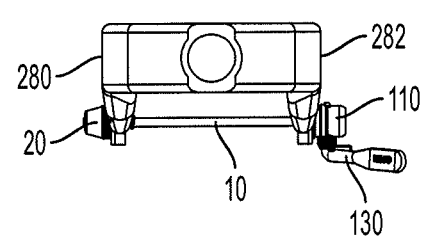

BICYCLE QUICK RELEASE CAM LEVER WITH BIASED CLOSURE

CROSS REFERENCE TO RELATED APPLICATION

This application claims the benefit of U.S. Provisional Application Ser. No. 62/205,546, entitled BICYCLE QUICK RELEASE CAM LEVER WITH BIASED CLOSURE, filed on Aug. 14, 2015, and also claims the benefit of U.S. Provisional Application Ser. No. 62/164,925, entitled BICYCLE QUICK RELEASE CAM LEVER WITH BIASED CLOSURE, filed on May 21, 2015, which are each incorporated by reference herein.

TECHNICAL FIELD

This application relates to quick releases for bicycles.

BACKGROUND

A typical quick release mechanism has a cam lever assembly which attaches to a skewer; at the other end of the skewer are threads for an adjusting nut. The assembly is intended to tighten by compression, such as a bicycle wheel in a fork or wheel mounting frame, when the adjusting nut is set and the cam lever is rotated to a closed position. The clamping occurs across the skewer and between the inboard cam lever face and the inboard adjusting nut face.

The amount of rotation is approximately 180 degrees, from an open position to a closed position. The mid-range position of the cam lever is typically the position of rotation of the lever arm as it projects outward in a direction parallel to the skewer axis. The fully closed position is the position of rotation of the cam lever arm where the arm is oriented in a direction perpendicular (which includes substantially perpendicular to) to the skewer axis, and parallel to the clamping face plane. The fully open position is the position of rotation of the cam lever arm where the lever arm is perpendicular to the skewer axis and about 180 degrees rotation from the fully closed position.

As a cam lever is rotated from fully open position to a fully closed position a cam portion of the lever reduces the amount of skewer reaching or spanning between the clamping faces and increases the clamping force.

SUMMARY

A quick release skewer assembly for use in mounting a wheel to wheel supporting fork comprises a camming lever that is pivotally coupled to the skewer for pivoting relative to the skewer between lever closed and lever open positions. With the skewer properly tightened on the fork, pivoting the lever to the lever closed position clamps the wheel to the fork with a clamping force. A biasing member coupled to the skewer and to the fork applies a biasing force that biases the lever toward the lever open position. When the skewer is insufficiently tightened, the biasing force moves the lever to a bias rest position between the lever closed and open positions. The positioning of the lever in the bias rest position provides a visual alert to an individual using a vehicle, such as a bicycle, that the wheel is insufficiently tightened.

In accordance with an aspect of an embodiment, an embodiment in accordance with this disclosure can comprise a biasing member or element coupled to or integrated into a cam lever assembly in order to provide a mechanical bias to the position of a lever. The embodiment also comprises the biasing element in combination with a wheel quick release assembly. The bias member positions the cam lever, when no significant clamping force exists across the skewer (unclamped quick release), or other external force is applied in a position between fully open and fully closed positions. The typical external force is applied by hand to rotate the cam lever. The torque provided by the biasing mechanism, such as a spring or an elastomer, is small enough to avoid or avert opening a properly tightened quick release assembly, and is desirably large enough to require an external force to move the lever to a fully open position.

In accordance with an aspect of an embodiment, a quick release cam lever includes an integrated biasing mechanism, such as a spring or elastomer, to position an unclamped quick release lever closer to a fully closed position than a fully open position when a quick release assembly that includes the quick release cam lever and biasing mechanism is not properly tightened. A quick release cam assembly including such a cam lever and biasing member is yet another embodiment.

In accordance with an aspect of an embodiment of a quick release of this disclosure, a bias that positions the lever between a mid-range position (e.g., such as parallel to the skewer) and a fully closed position adds safety by reducing the potential for a lever to become fully open and release the clamping force (e.g., the clamping force on the forks of a bicycle). A bias that positions the lever between fully open and the fully closed position, increases the visibility of the lever from significant viewpoints (e.g., a bicycle rider can more readily see a cam lever positioned perpendicularly or at another outwardly extending angle from the bicycle forks and away from a bicycle wheel). An example of a significant viewpoint is a bicycle rider's view of the front wheel axle when riding. Another example is the visibility of the lever when a bicyclist is dismounted. In accordance with more specific aspects of an embodiment, a quick release assembly including a cam lever with an integrated biasing mechanism, such as a spring or elastomer, desirably biases the lever to position an unclamped quick release lever within 65 degrees of its mid-range position; the mid-range position being approximately halfway between fully open and fully closed positions. The lever can, in accordance with an embodiment, be biased to position an unclamped quick release lever within a range of its normal rotation that is described as 30 degrees from fully closed to 30 degrees from fully open.

In accordance with another aspect of an embodiment, a quick release cam lever with an integrated mechanism, such as a spring or elastomer, is biased by a biasing force that requires the application of external (by hand) force in order to achieve a fully open position of the lever. A cam attached to the lever may be designed to overcome dropout safety tabs of bicycle forks when the external force is applied.

A quick release mechanism of embodiments of this disclosure with a biasing member as disclosed herein comprises a quick release mechanism that provides a bicycle rider with a greater opportunity to observe and identify an unclamped or insufficiently clamped quick release axle. Also, the biasing member can provide a biasing force that prevents the unclamped quick release bicycle lever from falling to a fully open position. In a fully open position, a cam lever could end up (if shifted more than 180° from a closed position) engaging a bicycle wheel or bicycle disk brake, for example, resulting in a pivotally dangerous condition.

In accordance with an embodiment, a quick release skewer assembly for use in mounting a wheel to a wheel supporting fork, the quick release skewer can comprise a lever having first and second lever end portions; a skewer having first and second skewer end portions; with the first lever end portion being pivoted to the first skewer end portion such that the lever is pivotal relative to the skewer about a lever pivot axis between closed and open positions. A biasing member such as a spring, or an elastomeric member, or a combination of a spring and an elastomeric member is coupled to the lever and to the skewer and applies a biasing force that biases the lever toward a bias rest position between the closed and open positions. A tensioning nut, which includes threaded nuts as well as other slidably coupled tensioning adjustment elements, can be coupled to the second skewer end portion, the tensioning nut being movable axially along the length of the skewer to: (a) at least one clamping position that establishes a first distance between the tensioning nut and the first lever end portion; and (b) at least one loose position that establishes a second distance between the tensioning nut and the first lever end portion. Pivoting the lever to the closed position with the tensioning nut in the at least one clamping position clamps the wheel to the wheel supporting fork with a clamping force that is greater than the biasing force and retains the lever in the closed while still allowing pivoting of the lever toward the open position by applying a force that, when added to the biasing force, is greater than the clamping force. Pivoting the lever to the closed position with the tensioning nut in the at least one loose position applies a clamping force that is less than the biasing force and the lever is moved by the biasing force to a bias rest position that is between the lever closed and lever open positions. The term loose position refers to a position where in the tensioning nut is insufficiently tightened such that the biasing force exceeds the clamping force applied by the lever in the closed position.

In accordance with an aspect of an embodiment, the bias rest position can be closer to the closed position than the open position. As a specific example, the bias rest position can be in the range of thirty degrees to sixty five degrees from the closed position in the absence of a clamping force. As a result, the miss-positioning of the lever away from the closed position to the bias rest position is visually observable, thereby increasing the likelihood a user will notice the loose lever before using a vehicle, such as a bicycle, with one or more wheels with the quick release skewer assembly. As another specific example, bias rest position can be within sixty five degrees of the position midrange between the lever closed position and the lever open position.

As another aspect of an embodiment, the biasing member can comprise a spring that provides a spring torque required to rotate the lever toward the open position from the bias rest position that is greater than the spring torque required to rotate the lever from the bias rest position toward the closed position.

As a more specific aspect of an embodiment, a quick release assembly can comprise a cap coupled to the first end of the skewer. The first end of lever can comprise a lever shank portion inserted through the cap and a first end portion of the skewer. In this embodiment, the shank and thereby the lever are being pivotal about a lever pivot axis. In addition, the biasing member can comprise a coil spring with coils surrounding the lever pivot axis and with a first spring end portion coupled to the lever and a second spring end portion coupled to the cap.

In accordance with aspects of embodiments, the biasing member, with or without a spring biasing component, can comprise an elastomeric member with a body having a cap receiving opening into which the cap is inserted and a neck portion with a neck opening surrounding a portion of the lever.

In accordance with an additional aspect, the biasing member can apply a biasing force that is from 0.005 to 0.200 in-lbs of torque per degree of rotation.

In accordance with yet another embodiment, a quick release skewer assembly for use in mounting a wheel to wheel supporting fork can comprise a lever having first and second lever end portions; a skewer having first and second skewer end portions; and wherein the first lever end portion is pivoted coupled to the first skewer end portion such that the lever is pivotal relative to the skewer about a lever pivot axis between closed and open positions. A biasing member, such as comprising at least one of a spring, or an elastomeric member, or a combination thereof, can be coupled to the lever and to the skewer to apply a biasing force that biases the lever toward a bias rest position between the closed and open positions. The biasing member moves the lever relative to the skewer to the bias rest position and away from the closed position in the absence of an opposing force toward the closed position that is greater than the biasing force. This embodiment may include one or more of the above described aspects.

In accordance with an embodiment, an elastomeric biasing member is provided for a quick release assembly having a skewer and a lever pivoted to the skewer and pivotal about a lever pivot axis between closed and open positions, the quick release assembly being used in mounting a wheel to a wheel supporting fork, and the closed position corresponding to the position wherein the wheel is clamped by the quick release assembly to the wheel supporting fork. The elastomeric biasing member can comprise a body having a first opening sized to surround a first end portion of the skewer and a neck with a second opening sized to surround a portion of the lever, the neck twisting relative to the body upon pivoting of the lever between lever open and lever closed positions to exert a biasing force between the skewer and lever that resists motion of the lever away from a lever bias position that is between the lever open and lever closed positions. As a result, the elastomeric biasing member exerts a biasing force against the lever that biases the lever to a bias rest position between the open and closed lever positions in the absence of an opposing force.

As a still further aspect of an embodiment, a quick release assembly can comprise an integrated biasing mechanism coupled to a lever and skewer of the quick release cam lever assembly so as to apply a biasing force that positions an unclamped quick release lever closer to a closed position than an open position when the quick release lever is not held in place by a force greater than the biasing force. The term integrated means an assembled state. The integrated biasing mechanism can comprise one or both of a spring and an elastomeric biasing member. In a desirable form, the biasing force is pre-set to establish a bias rest position, in the absence of a force opposing the biasing force that-positions the lever in a range from thirty degrees from the open position to thirty degrees from the closed position.

These and other features and aspects of embodiment will become more apparent from the drawings and description below.

BRIEF DESCRIPTION OF THE DRAWINGS

FIG. 4A is an exploded view of the quick release of FIG. 2.

FIG. 4B is an end view of a lever portion of the quick release of FIG. 4A.

FIG. 5B is an exploded view of another embodiment of a quick release in accordance with this disclosure.

FIG. 10 is a view looking downwardly toward the top of a bicycle wheel showing a quick release assembly in accordance with this disclosure with a lever biased to a position between fully open and fully closed positions when the lever is not clamped in the closed position.

FIG. 11 is another embodiment of a quick release mechanism assembly in accordance with this disclosure, FIG. 11 being an exploded view thereof.

FIG. 27 illustrates a bicycle fork with a quick release mechanism in accordance with one embodiment of this disclosure shown in place on the bicycle fork.

FIG. 28 is a side view of the bicycle fork of FIG. 27.

FIG. 29 is a top view of the bicycle fork of FIG. 27.

DETAILED DESCRIPTION

In view of the many possible embodiments to which the principles of the disclosed invention may be applied, it should be recognized that the illustrated embodiments are only examples, and should not be taken as limiting the scope of the invention. All novel and non-obvious combinations and sub-combinations of elements described herein are within the scope of the invention.

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises" and the terms "including" and "having" have the same meaning as "comprising".

Figure 1:
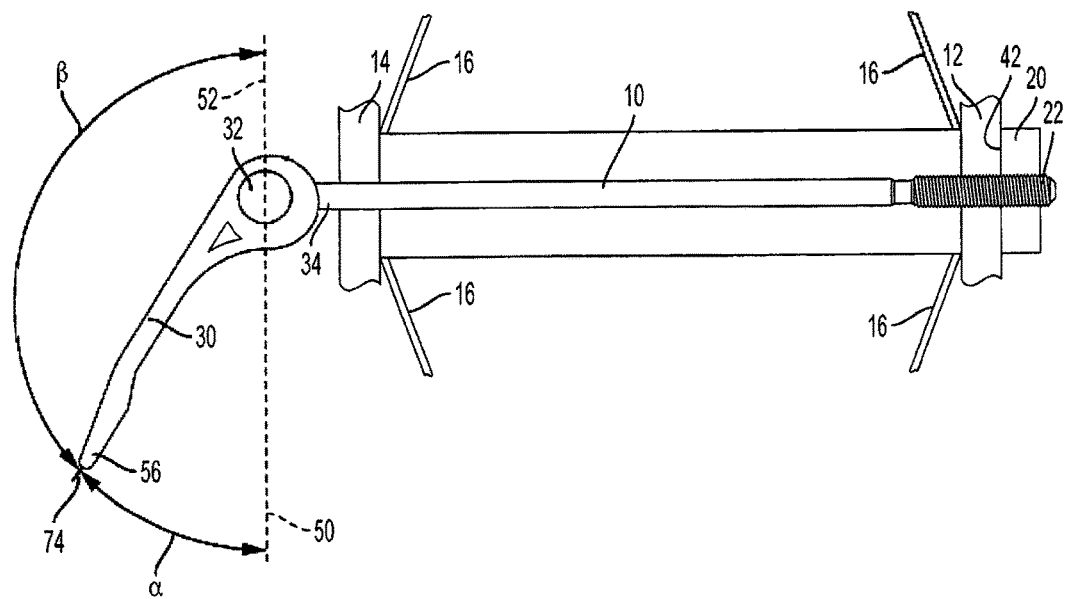
FIG. 1 is side elevation view of one form of a quick release mechanism in accordance with one embodiment.

FIG. 1 illustrates an exemplary form of quick release cam lever assembly for a bicycle. In FIG. 1, a skewer 10 is shown that spans and exceeds the distance between first and second forks 12, 14 of a bicycle. Some bicycle wheel spokes 16 are also shown in this figure. These spokes are coupled to the rim of a bicycle wheel that supports a bicycle tire. Other forms of tire supports can be used. A tension adjusting nut 20 is shown attached (e.g., threaded) onto a first end 22 of the skewer 10. A lever 30 is pivoted by pivot 32 to a second end 34 of skewer 10 opposite to the first end 22. The lever 30 in operation is moved toward a locking position (through an angle α in this example) to clamp the skewer in place; a clamping action being provided by the lever 30 accomplishes this locking. The positioning of the tensioning nut is adjustable by moving the nut axially along the skewer toward the lever (reducing the distance between the lever camming surface and the tensioning nut to thereby increase the clamping force. In addition, the tensioning nut can be moved away from the camming surface of the lever to reduce the clamping force. It should be noted that the closed position need not be a lever down position, but it often is. It is possible, with conventional quick release levers, for the end 56 of lever 30 to pivot to a position beyond open position 52 (shown in FIG. 1 as being through an angle β beyond the angle α) and toward the bicycle wheel. Moreover, it is possible for such levers of conventional quick releases to over pivot an open position and actually engage the spokes or disc brake of a bicycle, which can result in a hazardous or potentially hazardous situation.

In addition, if a conventional lever is shifted to a closed position where it applies insufficient clamping forces to properly clamp the skewer in place, (e.g., if nut 20 is not tightened sufficiently) there is no visual indication to the bicycle user that the wheel is improperly clamped in place.

In accordance with this disclosure, and with reference to the figures, a quick release assembly is provided with a biasing mechanism or member for biasing the lever 30 away from the closed position to a position desirably between the closed position 50 and open position 52 when the adjustment nut 22 is insufficiently tightened such that the lever, when in a closed position, does not securely clamp a bicycle wheel in place. This loose state of the lever is present when the biasing force applied by the biasing member to bias the lever toward the open position is greater than the clamping force applied by the lever when in a lever closed position.

Figure 2:
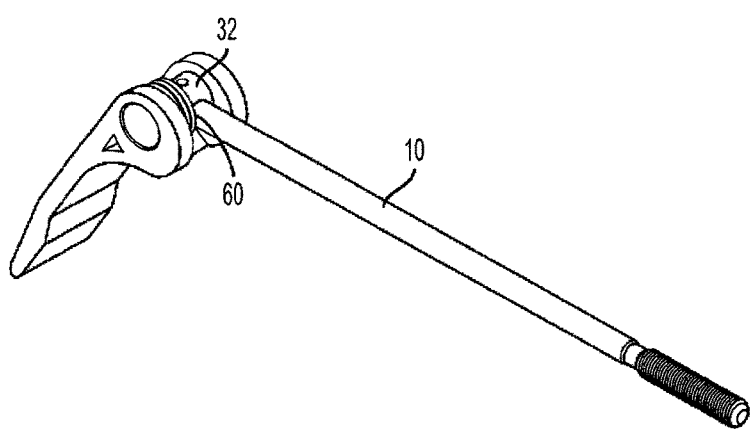
FIG. 2 is a perspective view of the embodiment of FIG. 1.

In FIG. 2, one can see one form of the biasing mechanism is or comprises a coil spring 60. One end of the spring is typically coupled to and retained by the lever with the other end of the spring retained by a lever supporting pivot 32. For example, an opening 62 (FIG. 4A) can be provided in pivot 32 to receive one end of the spring 60 and a corresponding opening 80 (FIG. 3) can be provided in one of the sidewalls or barrel or central portion of the lever 30. Desirably, the force exerted by the spring or other biasing member (which can be an elastomer, such as an elongated piece of elastic or rubber, such as a rubber or elastic band or both a spring and an elastomer in combination) shifts the lever between the closed and open positions when the quick release is insufficiently tightened.

For example, the lever can be biased to the position shown at 74 in FIG. 1, a distance or angle α from the closed position 50. Consequently, a bicycle rider or other vehicle rider can more readily see that the quick release is not properly clamping the skewer in place. That is, it is easier for the bicycle rider to see the outwardly projecting location of the lever and be visually alerted to the potential problem. The angle α can be predetermined or pre-set, such as by establishing the tension of the biasing member such as the spring. For example, a is desirably between 30 and 65 degrees. Other desirable angles can also be used. In addition, the spring 60, in this example, prevents the lever 30 from moving to the open position 52 unless the lever is actuated by an opening force, such as by a user's hand. This reduces the risk of the lever shifting to a fully open position and releasing the wheel from the bicycle forks. Also, this biasing prevents the lever from rotating beyond the position 52 (or other open position) and into the disc brake or spokes of a wheel.

Figure 3:
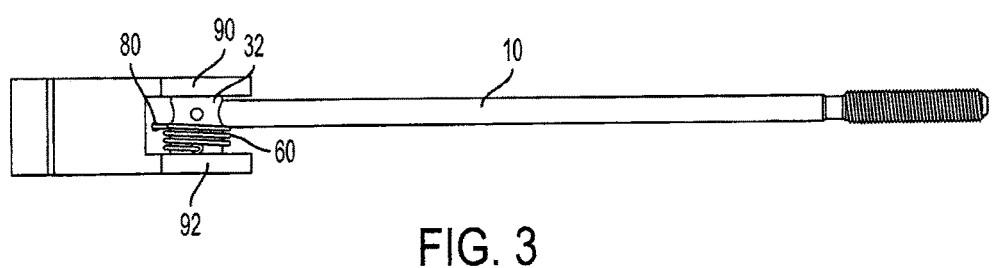
FIG. 3 is a top view of the quick release of FIG. 2.

FIG. 3 shows a top view of the exemplary quick release assembly of FIG. 2 and also shows the opening 80 positioned in this example in the lever for receiving one end of the illustrated spring biasing member 60. The respective lever sidewalls 90, 92, between which the skewer 10 is positioned, assist in maintaining the spring on the pivot 32.

FIG. 4A illustrates an exploded view of the embodiment of FIG. 1. FIG. 4B is an end view of a form of lever usable in the embodiment of FIG. 1.

Figure 5A:
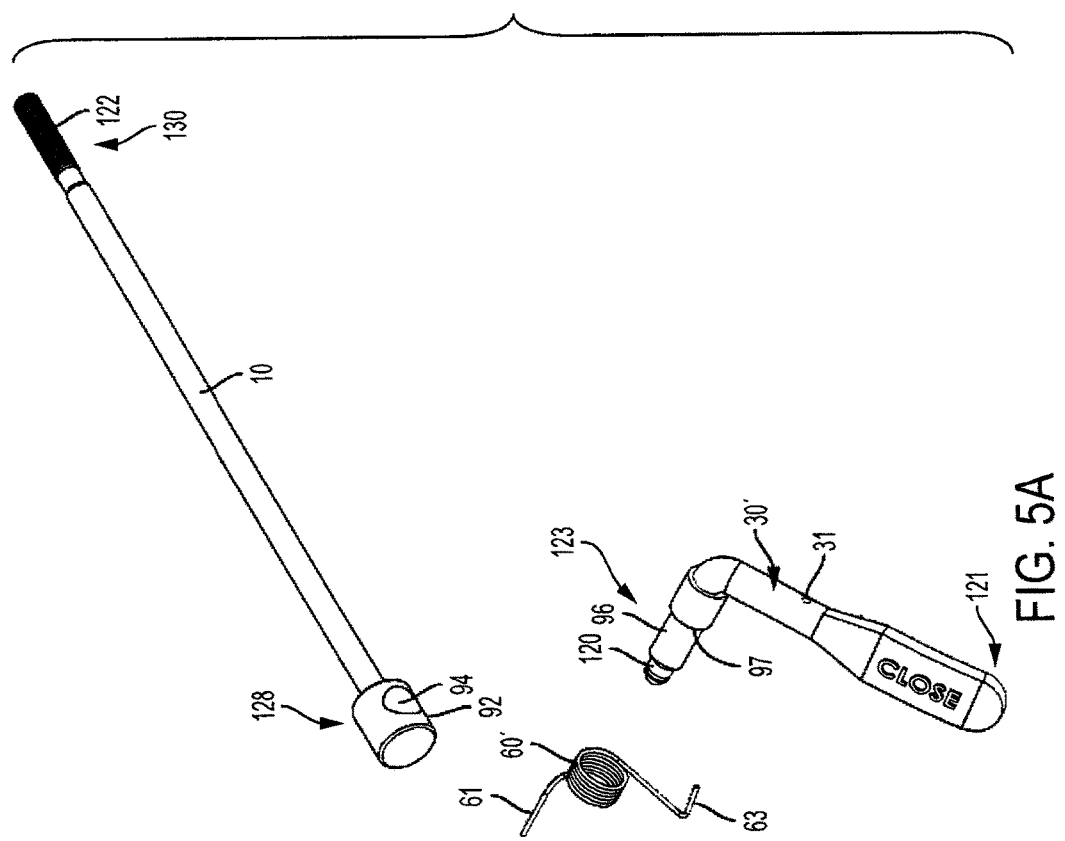
FIG. 5A is an exploded view of an alternative embodiment of a quick release in accordance with this disclosure.
Figure 9:
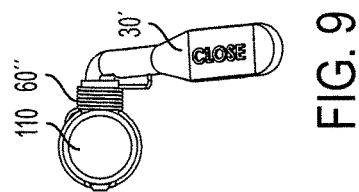
FIG. 9 is an end view of the quick release of FIG. 6.
Figure 6:
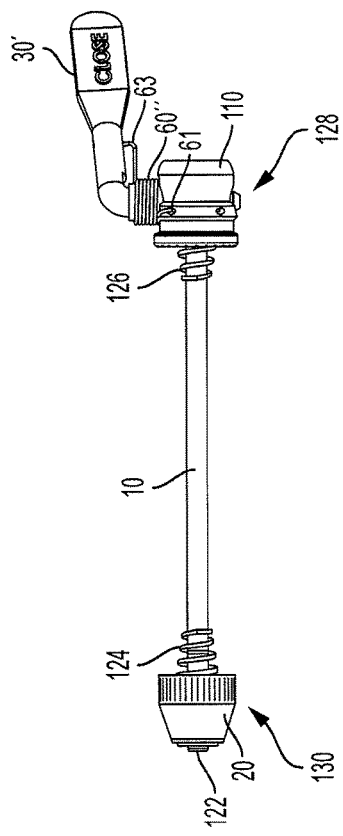
FIG. 6 is a top view of an assembled quick release of FIG. 5B.
Figure 7:
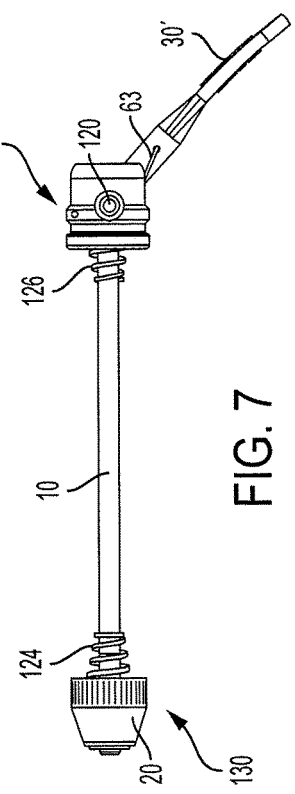
FIG. 7 is a side view of the quick release of FIG. 6.
Figure 8:
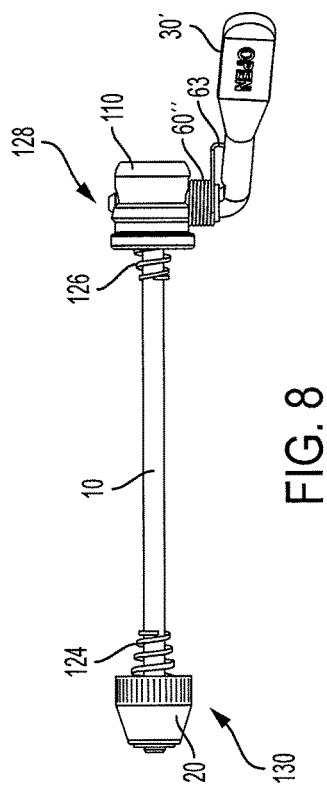
FIG. 8 is a bottom view of the quick release of FIG. 6.

FIG. 5A illustrates an exploded view of an alternative form of quick release in accordance with this disclosure. The embodiment of FIG. 5A utilizes a skewer 10 with an enlarged end portion 92 having an opening 94 therethrough that is perpendicular to the longitudinal axis of the skewer 10. The opening 94 receives a coupling end or lever shank portion 96 of a lever 30'. More specifically, in this embodiment a cap 110 is placed on the enlarged end 92. The cap has opposed openings (one of which is numbered as 112 in FIG. 5A) that are aligned with the opening 94 when the cap is in place (see FIGS. 6-10). The lever shank portion 96 of lever 30' is inserted through the aligned openings 94, 112. A retaining element, such as a ring, cotter pin or other member can be coupled or fastened to the distal end 120 of lever portion 96 to retain the assembly together. An exemplary biasing spring 60' is shown in FIG. 5A, as well. The illustrated cap can have a groove 114, such as an annular groove, that receives and engages an end portion 61 of a spring 60'. An opening can be provided in the groove for receiving the distal end of the spring end portion 61. The body of the lever has an opening 31 for receiving and engaging the other end portion 63 of the spring. (See FIGS. 6-10).

FIG. 5B illustrates an embodiment like that of FIG. 5A except that a coil spring 60" of a slightly different form is used. The end 61 of spring 60" is arcuate or curved so that it can be positioned partially in the groove 114 in the cap 110. The end of spring 60" may also be retained in a spring receiving opening 115 in the cap or simply retained in the cap groove 114. In FIG. 5B, numbers for elements corresponding to elements of FIG. 5A are the same and will not be discussed further.

In FIG. 5B, the skewer 10 has a proximal or first end that includes end portion 92 and that receives the shank portion 96 of lever 30'. The skewer 10 also has a second or distal end spaced from the lever. Threads are shown adjacent to the distal end of the skewer for receiving a tightening nut or cap. In the embodiment of FIG. 5B, a distal end of the lever, spaced from the skewer, is shown. In addition, a proximal end 96 of the lever that engages the skewer is also shown in this figure.

Again, the spring utilized in the embodiment of FIG. 5B is of a slightly different configuration than the spring shown in FIG. 5A and has been labeled as 60". The spring 60" has a first end portion 61 for engaging the cap 110, such as by inserting the end of spring portion 61 into an opening 115 provided in the cap 110. In addition, spring 60" has an end portion 63 for insertion into an opening 31 in the body of the lever to engage the lever. The spring is coupled to the lever at a location spaced from a lever pivot axis about which the lever pivots. In this example, the opening 31 is positioned at a location between shank portion 96 of the lever and the distal end of the lever and more specifically, about one third of the length of a projecting arm portion of the lever (about ⅓ of the distance between the shank portion 96 and the distal end of the lever. With this construction, the spring operates to bias the lever toward an open position if the skewer is loose.

FIGS. 6, 7, 8, and 9 show an assembled quick release in the form shown in FIG. 5A. As can be seen in these figures, the spring 60' in this embodiment is positioned externally to the cap 110 with the end portion 63 of the spring engaging the lever 30' and the other end portion 61 of the spring being positioned within the groove 114 in the cap 110 and the distal end of spring end portion 61 inserted into a cap opening. A tension adjusting nut 20 is shown threaded onto the skewer 10 at the opposite end of the skewer from the lever in these FIGS. In addition, springs 124, 126 are shown on the skewer 10 adjacent respectively to the distal end 130 and proximal end 128 of the skewer. These springs provide a biasing force between the forks of a bicycle and the respective nut 20 and cap 110.

The biasing mechanism of this disclosure desirably positions a loose lever, one that is not been tightened sufficiently to secure the wheel in place, to a bias rest position.

FIG. 10 illustrates an exemplary bias rest position of the arm portion of lever 30. In the bias rest position, the lever arm in this embodiment is desirably nearer to the closed lever position 127 than to the open lever position 129. In FIG. 10, the lever arm is shown at a bias rest position that is about 60 degrees from the closed lever position 127. Desirably, the bias rest position is in the range of from 30 to 90 degrees from the closed lever position. At a 30 degree bias rest position, the lever would project out past the body of most suspension fork tubes of a bicycle and be at a position wider than the road forks. This makes the lever more visible to a bicycle operator to assist in alerting the bicycle operator that the quick release has not been fully tightened. At the 90 degree position, the lever is sticking outwardly in the axial direction away from the skewer 10. In this position, in one example, the distal end of the lever would be positioned approximately 1½ inches beyond the suspension tube at the lever side of a bicycle.

In accordance with an aspect of one embodiment, the biasing force applied by a biasing mechanism, such as a spring, elastomer or a combination of a spring and an elastomer, is selected to position an unclamped (which can include insufficiently clamped) or loose lever within sixty five degrees of its mid-range position (the mid-range position being between the fully open and fully closed positions of the lever such as when the lever is parallel to the longitudinal axis of the skewer). In accordance with an alternative embodiment, the biasing force applied by such a biasing mechanism is selected to position an unclamped or loose lever in a reduced range of its normal rotational position, such as desirably in a range of from thirty degrees from the fully closed position of the lever to thirty degrees from a fully open position. Desirably, in accordance with an aspect of an embodiment, the application of an external force (by hand) is required to move the loose lever to a fully open position. A cam attached or coupled to the lever may be designed to overcome drop out safety tabs of a conventional bicycle fork with the external force is applied.

The lever of the example shown in FIG. 10 is rotated a full 180 degrees from the fully open or open position to the fully closed or closed position. In one example, the lever reduces the effective length of the skewer by about two millimeters. The distance varies with the geometrical shape of the lever components. At a 90 degree angle from a closed position, one would expect that there would need to be a reduction of one millimeter of skewer length to place the lever in a fully closed position. However, only 9/10 of a millimeter of a skewer remains to be reduced in the illustrated geometry. Even though the lever is only halfway closed, the skewer is more than halfway tight when the lever is in the 90 degree position.

The various biasing members disclosed herein, and combinations of such members, desirably are selected to bias the lever as described in connection with FIG. 10.

One example of a suitable spring is a torsion spring having a number of side by side coils. One specific example is a TO-5134LS left hand wound spring from Century Spring Corp. of Los Angeles, Calif. Such a spring can be of stainless steel and thereby corrosion resistant. With a left hand wind, the spring torque rotating the lever toward the open position is greater than the spring torque rotating the lever toward a closed position. This is desirable, although not required, because, when the skewer is loose, it is more desirable to have an equal or greater tendency for the spring to move the lever arm away from the open position than away from the closed position.

One suitable spring rate is 0.008 in-lbs per degree of rotation in the direction of closing the lever, which is, in one embodiment, the direction that constricts the spring. In one specific example, such a spring returns the lever to a 135 degree position from an open position, but does not return the lever to the 45 degree position from a closed position.

A desirable range of torque is from 0.005 to 0.200 in-lbs of torque per degree of rotation. The low end of this torque range would work for most quick release devices which have minimal friction in their lever operation. The high range of the torque per degree of rotation would require a hand grip force at 20 pounds to move the lever to the open position. The torque at the high end of the range would require 9 pounds of additional force to tighten the quick release to overcome the spring. A desirable value of spring torsion would overcome a reasonable amount of lever friction and be easy to move by hand.

A particularly desirable torque would be about 0.03 in-lbs per degree (0.003 Newton meters). With a spring unstressed at a lever position of 45 degrees, the additional grip force to tighten the quick release would be about one pound or four percent more than the grip force required without the spring. The grip force to hold the lever completely open is then close to four pounds. These values assume that the spring torsion, to open or to close the quick release, is the same. As mentioned above, the torsion spring can be set for a lower force on the closing direction side, depending, for example, on how the spring is wound and used.

The embodiment of FIGS. 11-17 is similar to the embodiment of FIG. 4A, although a somewhat different spring configuration 160 is used from the spring 60 in FIG. 4A and a different structure is utilized for coupling the spring to the lever and skewer.

In the embodiment of FIG. 11, a skewer 10 is shown with a first proximal end portion 128 adjacent to the quick release lever assembly 8 and a second distal end portion 130 spaced from the quick release lever mechanism. End 130 can be threaded as indicated by threads 122 for receiving an adjustment cap or nut, not shown in FIG. 11.

The lever 131 in FIG. 11 comprises a proximal end portion 158 adjacent to the skewer when the mechanism is assembled and a distal end portion 156. The proximal end portion 158 comprises first and second spaced apart flanges 190, 192, each having a respective aperture 195, 197 therethrough. In this embodiment, the apertures or openings 195, 197 are aligned in a direction that is transverse to the longitudinal axis of the skewer 10 when the device is assembled. A slot 191 is provided between the flanges 190, 192. In effect, distal end portion 158 of the lever 131 is bifurcated in this example to provide a skewer receiving slot or opening between lever pivot supporting projections, such as the flanges 190, 192.

A pivot 132 is positioned within the openings 195, 197 and spans the slot 191 when the quick release mechanism is assembled. The end of distal end portion 128 of skewer 10 is inserted into an opening 189 in the pivot 132 with a portion of distal end portion 128 of the skewer positioned in the slot 191. The pivot 132 comprises an end portion or face 165 having a spring receiving slot 162 extending from the surface 165 into the body of the pivot. As also can be seen in FIG. 11, the illustrated lever comprises a shelf portion 193 adjacent to the base of the flange 192. A spring receiving opening 195 is provided in the shelf portion 193 with the opening 195 extending into the lever from the surface of the shelf, for example, toward the distal end 156 of the lever from the shelf. Other alternative structures can be used to couple the spring to the skewer and to the lever.

The illustrated spring 160 in this FIG. 11 example comprises a coil spring that can provide spring tension or torque, such as desirably in ranges as previously discussed. The spring 160 comprises respective first and second end portions 161, 163. End portion 161 extends within a circular interior area of the spring that is surrounded by coils 165 of the spring 160. Spring end portion 161 is inserted into or positioned within the slot 162 to engage or couple the spring to the pivot, and thereby to the skewer; via the connection between the pivot and skewer due to the insertion of skewer end 128 into opening 189. The skewer can be secured within the opening 189, such as by adhesive, welding, threading or other approaches. The pivot can be of metal or any other suitable material, such as a polymer material. The skewer is typically of a strong durable material such as metal, with stainless steel being one example.

The end portion 163 of the spring 160 is inserted into the opening 195 in lever 131 to complete the spring to lever coupling. Thus, the biasing member in this example engages the skewer and the lever.

Figure 12:
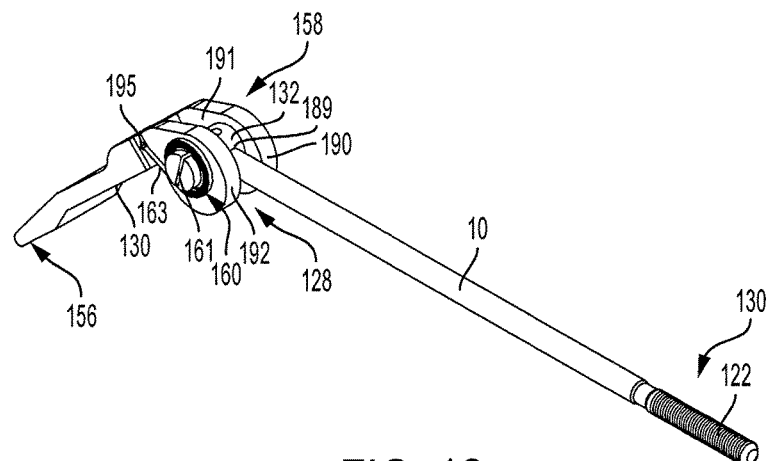
FIG. 12 is a perspective view of the embodiment of FIG. 11.

FIG. 12 illustrates a perspective view of the embodiment of FIG. 11 in an assembled state.

Figure 13:
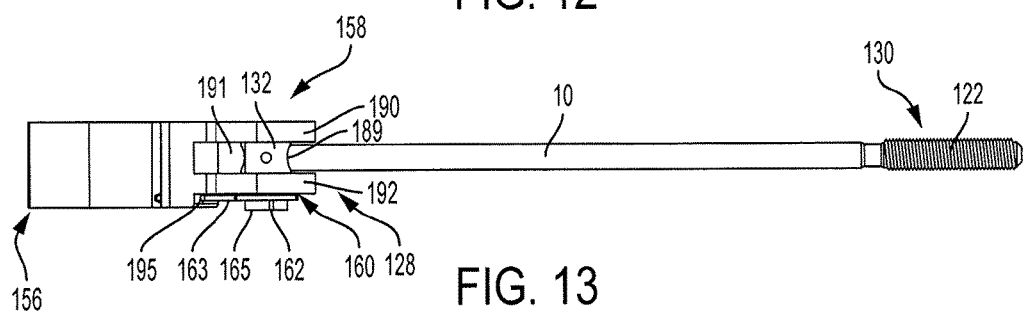
FIG. 13 is a top view of the embodiment of FIG. 12.

FIG. 13 is a top view of the embodiment of FIG. 12.

Figure 14:
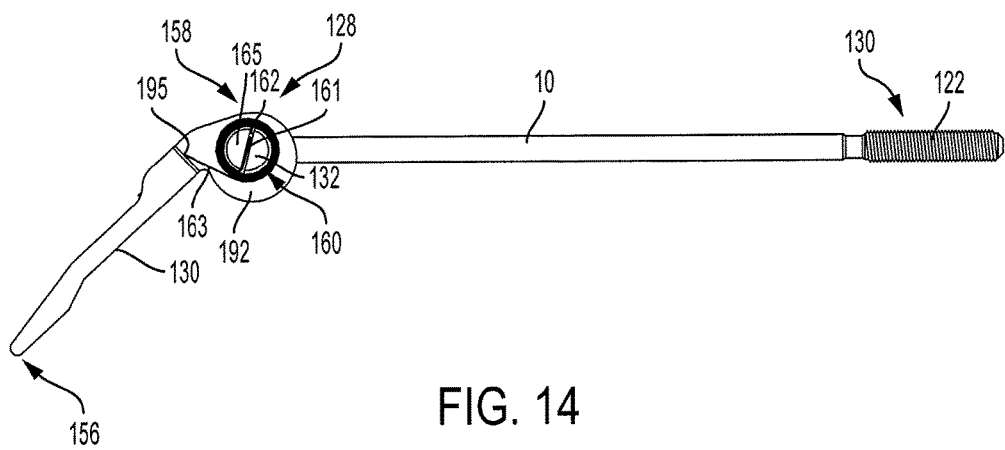
FIG. 14 is a side view of the embodiment of FIG. 12.

FIG. 14 is a side elevational view looking toward the spring side of the embodiment of FIG. 12.

Figure 15:
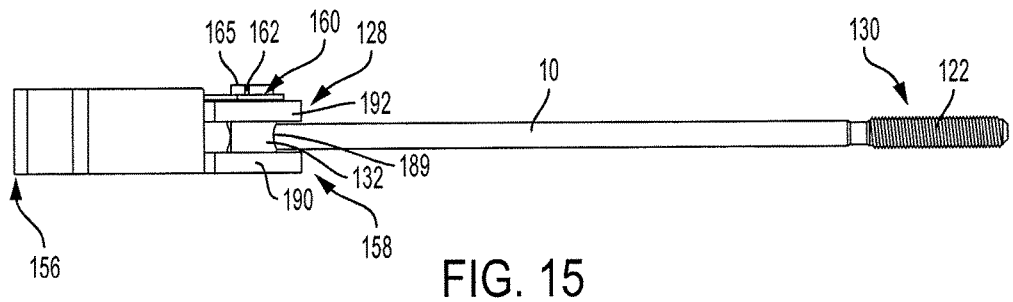
FIG. 15 is a bottom view of the embodiment of FIG. 12.

FIG. 15 is a bottom view of the embodiment of FIG. 12.

Figure 16:
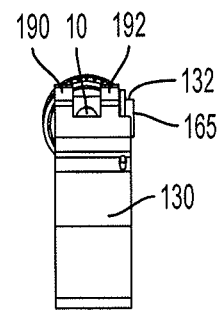
FIG. 16 is an end view of the embodiment of FIG. 12 looking toward the lever from the lever end.

FIG. 16 is and end view of the embodiment of FIG. 12, looking toward the lever end of the quick release assembly.

Figure 17:
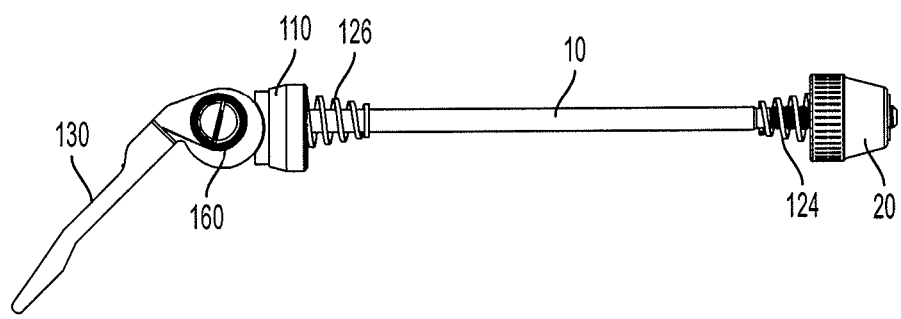
FIG. 17 is a view of the embodiment of FIG. 12 with an end cap shown in place along with springs used on a skewer of this quick release mechanism.

FIG. 17 is a side elevational view of the quick release of FIG. 12, but with a tension nut or end cap 20 in place and also with skewer springs 124 and 126 in place to show an example of one completed embodiment of an exemplary quick release assembly.

Figure 18:
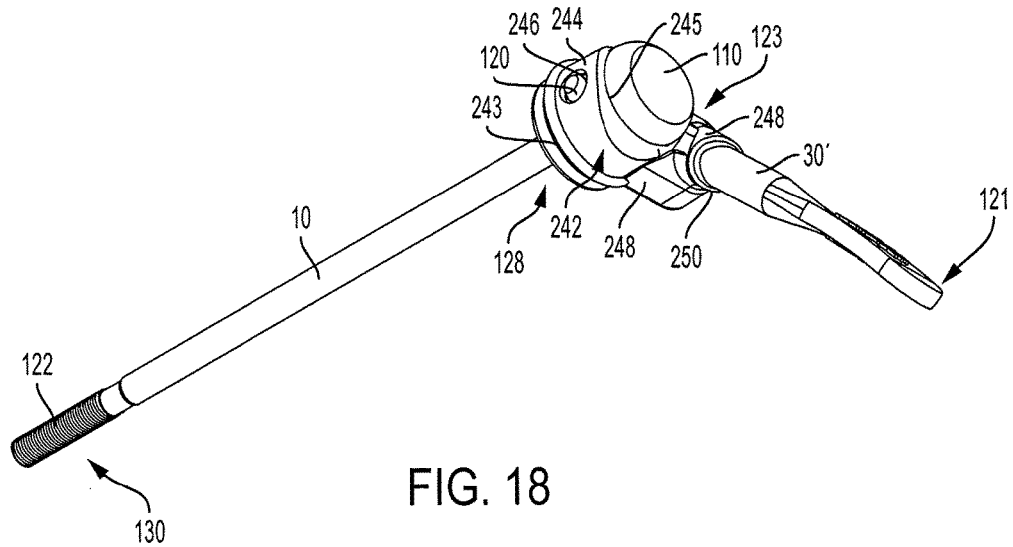
FIG. 18 is a perspective view of an embodiment of a quick release mechanism with an elastomeric biasing member.
Figure 19:
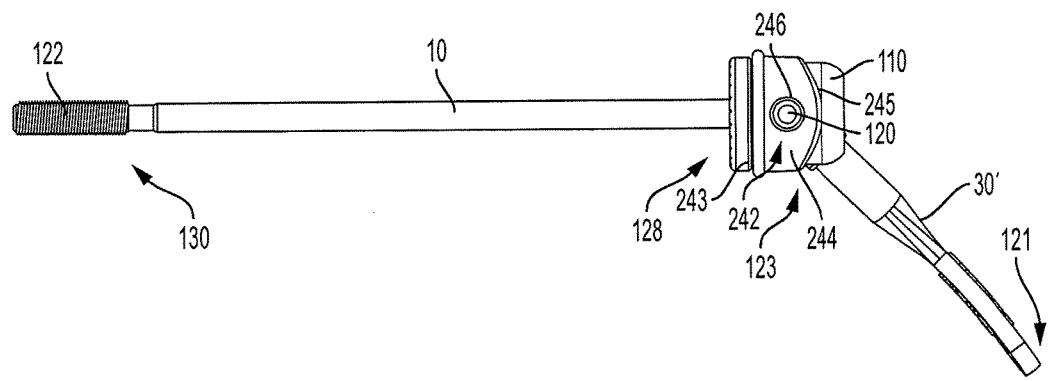
FIG. 19 is a side view of the embodiment of FIG. 18.
Figure 20:
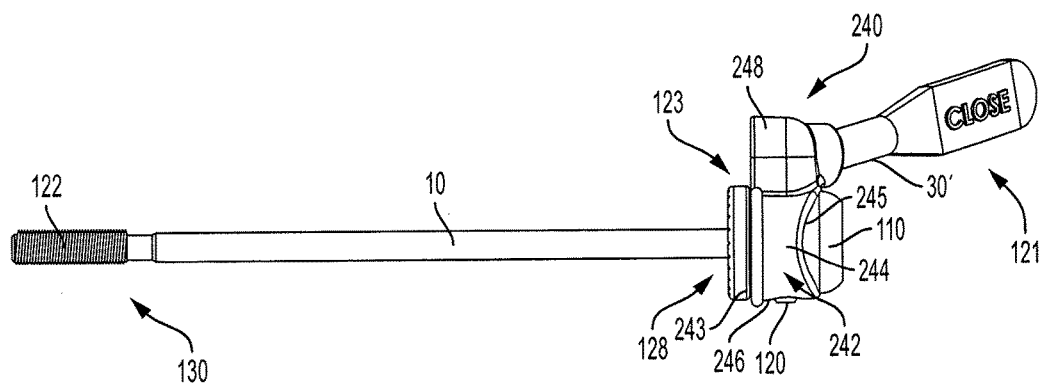
FIG. 20 is a top view of the embodiment of FIG. 18.
Figure 21:
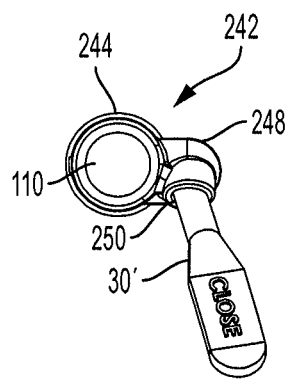
FIG. 21 is an end view of the embodiment of FIG. 18.
Figure 22:
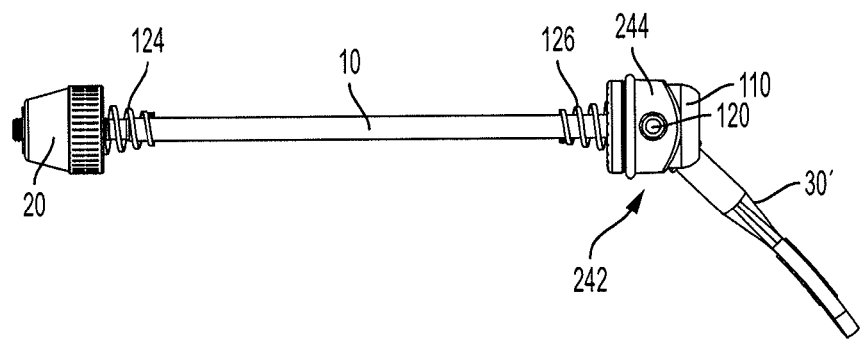
FIG. 22 is a side view of the embodiment of FIG. 18 with an end cap and springs on the skewer of this embodiment.
Figure 23:
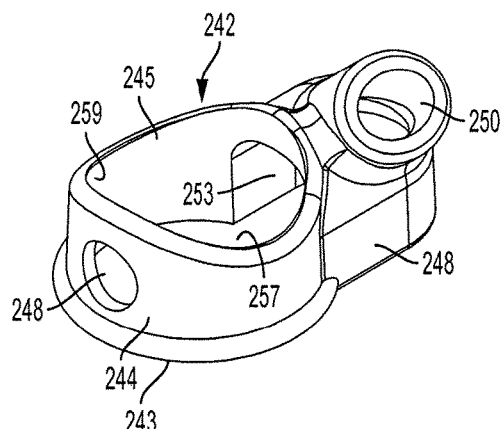
FIG. 23 is a perspective view of one form of an elastomeric biasing member usable in the embodiment of FIG. 18.
Figure 24:
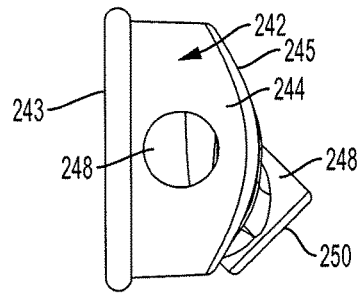
FIG. 24 is an end view of the embodiment of FIG. 23.

FIGS. 18-22 illustrate another embodiment of a quick release mechanism in accordance with this disclosure. FIG. 18 is a perspective view of this embodiment; FIG. 19 is a side elevational view of this embodiment; FIG. 20 is a top view of this embodiment; FIG. 21 is an end view of this embodiment; and FIG. 22 is a side elevational view of this embodiment with a tensioning cap or nut 20 and skewer springs 124, 126 shown on the skewer 10.

In the embodiment of these FIGS. 18-22, the lever can be, for example, like the lever of FIG. 5A. The lever in FIGS. 18-22 can comprise a proximal end 123 with a pivot structure such as barrel or pivot 96 for engaging the skewer 10 as illustrated in FIG. 5A. Referring back to FIG. 5A, the lever 30' comprises a proximal end 123 and a distal end 121. The barrel or lever shank 96 is desirably cylindrical and thus rotatably coupled to the lever 30' when inserted in the opening 94. A shelf 97 or enlarged portion of the lever end 123 comprises a stop that can operate to limit the depth of insertion of the barrel or pivot 96 into the skewer.

Unlike the above described embodiments that employ a biasing member in the form of a spring, such as springs 60' and 60", that are used to bias the lever as previously explained, the biasing member in this FIGS. 18-22 example comprises an elastomeric structure. In the specific form shown, the elastomeric structure comprises a body 242 with a first body portion 244 that, in this embodiment, surrounds the cap 110. The body portion 244 has an internal cavity shaped to receive the cap and can have opposed openings 243, 245 to allow body portion 244 to receive the cap 110 when inserted therein. The illustrated body portion 244 can also have an opening 246 through which the end portion 120 of the lever can extend.

In the illustrated form, although not required, the body portion 244 can have a depth that is shorter than the height of the cap 110. Consequently, the end portion of the cap spaced from the skewer 10 is exposed through opening 245 and not overlaid by the body portion 244 in this example. In addition, the body 242 can also comprise a lever receiving and engaging body or neck portion 248 projecting from the body portion 244. Body portion 248 comprises an opening 250 through which the proximal end of the lever 30' is inserted when the lever is coupled to or positioned in engagement with the skewer. In the illustrated construction, the body portion 244 surrounding the cap 110 is coupled by the cap to the skewer. In addition, the projecting portion 248 is coupled to the lever. Hence, the elastomeric biasing element is coupled to the lever and skewer to bias the lever away from a fully closed position when the skewer is loose.

In addition, the opening 250 and body portion 248 are oriented in this embodiment to bias the lever, when the quick release is loose, to project outwardly from the skewer to the bias rest position as explained above in connection with FIG. 10. When the lever is moved to a closed position, the body 242 resists closing of the lever and provides a torsional resistance force, such as in the range as explained above in connection with spring biasing members. In addition, when the lever is moved to the fully open position, the body portion 248 is twisted relative to the main body portion 248 to provide torsional resistance to this motion.

The material comprising body portions 244 and 248 can be an elastomeric material, such as, for example, rubber, with the elastomeric material for example having a durometer of 20 to 80 on the Shore A scale with a durometer of 50 on the Shore A scale being a specific example. The material can be selected to provide torsional resistance forces in the same manner and within the ranges provided by the springs as previously discussed.

As an alternative construction, the body portions 244 and 248 can be separate components of a different material, such as of a rigid material, with an elastomeric material inter-coupling these components to provide the desired biasing forces. This latter construction can also be deemed an elastomeric biasing structure.

FIGS. 23-26 are respective perspective, end, top and side views of an exemplary elastomeric biasing element usable in the embodiment of FIGS. 18-22 with numbers for elements in FIGS. 23-26 being the same as the numbers for corresponding elements in FIGS. 18-22. These FIGS. 23-26 illustrate an exemplary elastomeric biasing member suitable for use in the embodiments of FIGS. 18-22 in greater detail.

Figure 25:
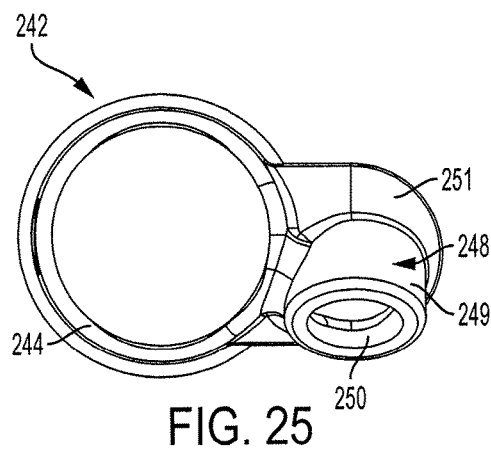
FIG. 25 is a top view of the embodiment of FIG. 23.
Figure 26:
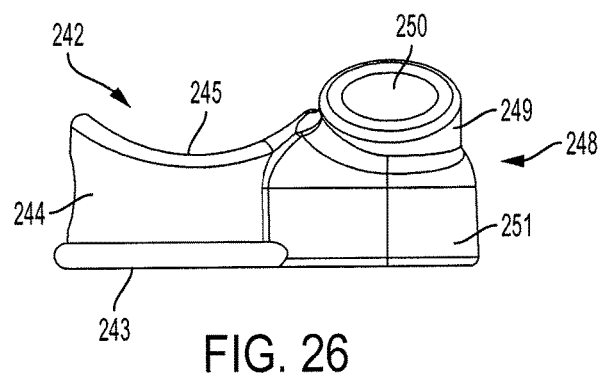
FIG. 26 is a side elevation view of the embodiment of FIG. 23.
Figure 30:
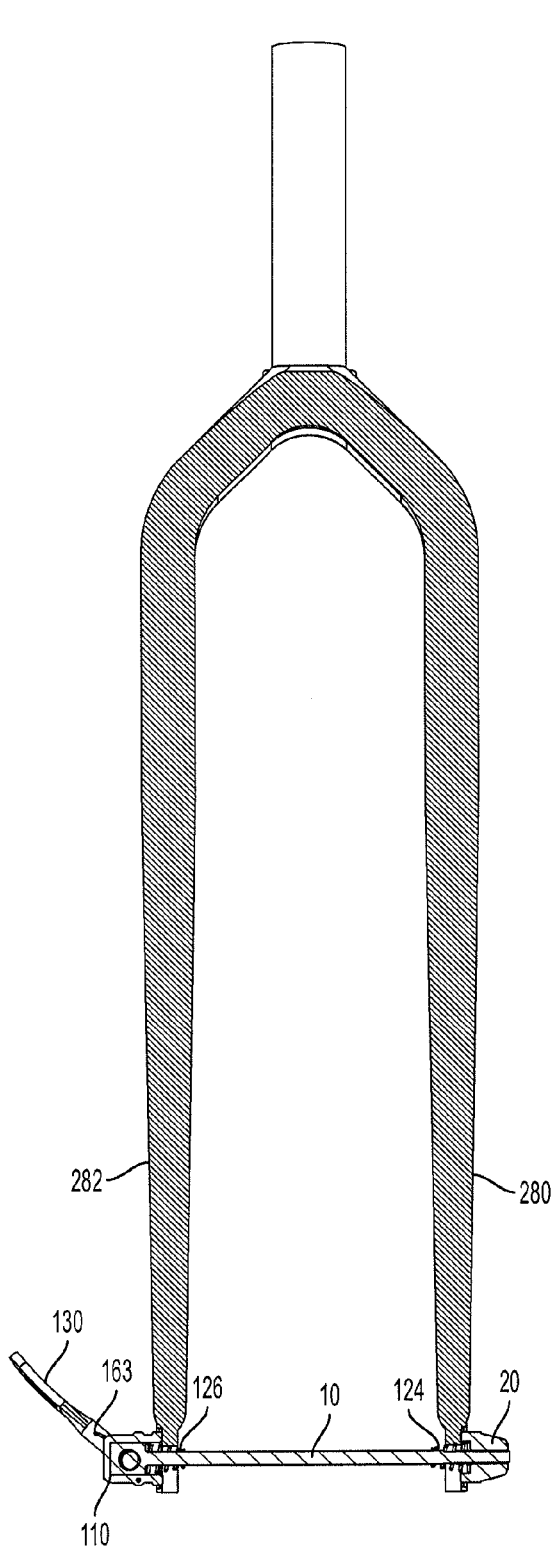
FIG. 30 is a partially sectional view of a bicycle fork with one form of quick release mechanism in accordance with this disclosure.
Figure 31:
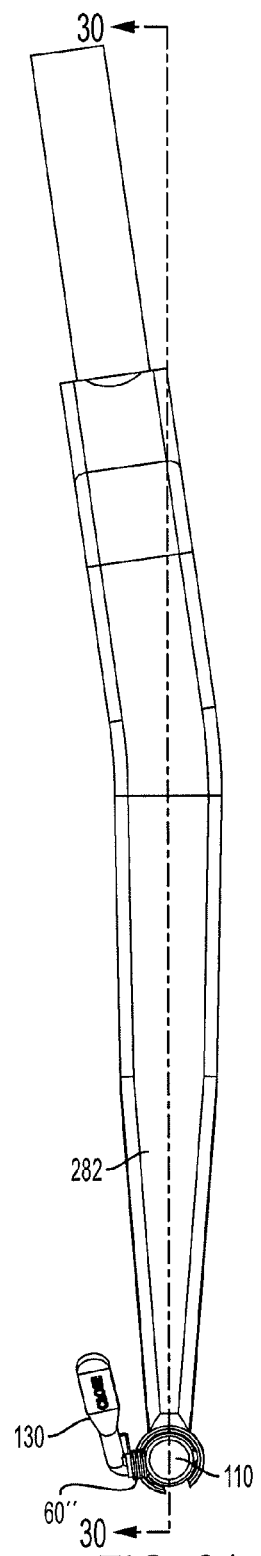
FIG. 31 is a side view of the embodiment of the bicycle fork of FIG. 30 with the quick release assembly in place.
Figure 32:
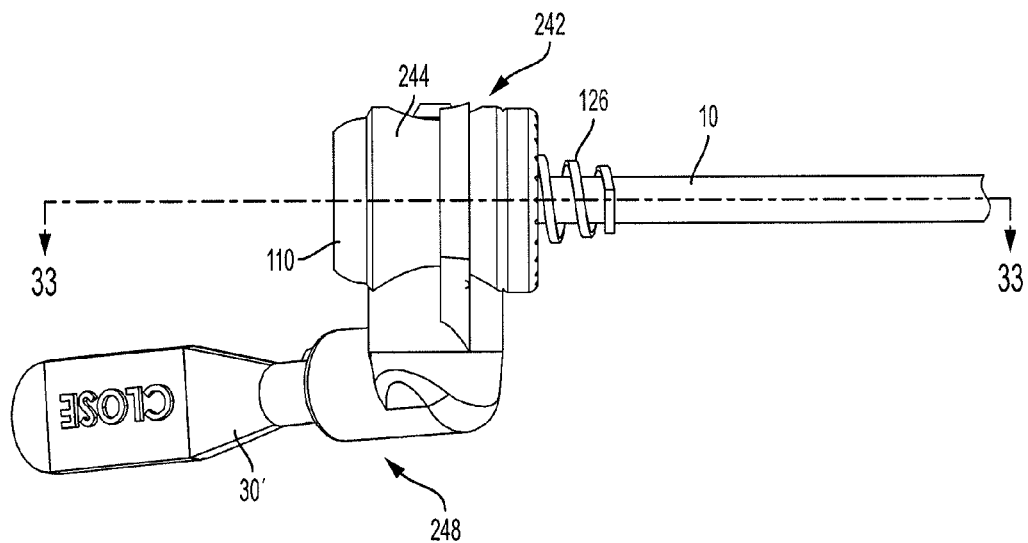
FIG. 32 illustrates a quick release assembly comprising a combination of an elastomeric member and a spring as the biasing member for the quick release assembly.
Figure 33:
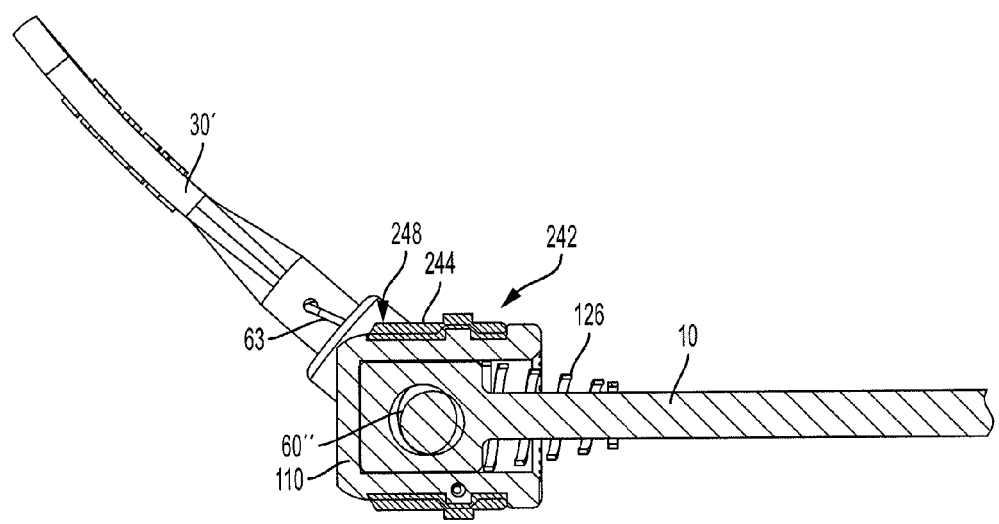
FIG. 33 is a partial vertical sectional view of the embodiment of FIG. 32.
Figure 34:
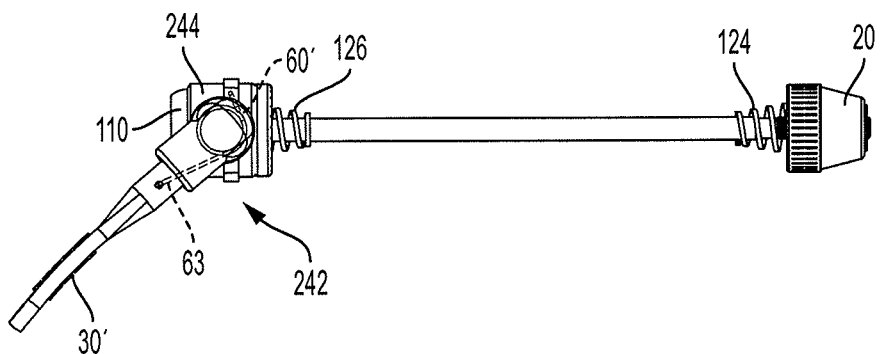
FIG. 34 is a side elevational view of the embodiment of FIG. 32 with a biasing member that comprises a combination of an elastomeric structure and a biasing spring; with an end cap and springs shown on the skewer of this quick release assembly.
Figure 35:
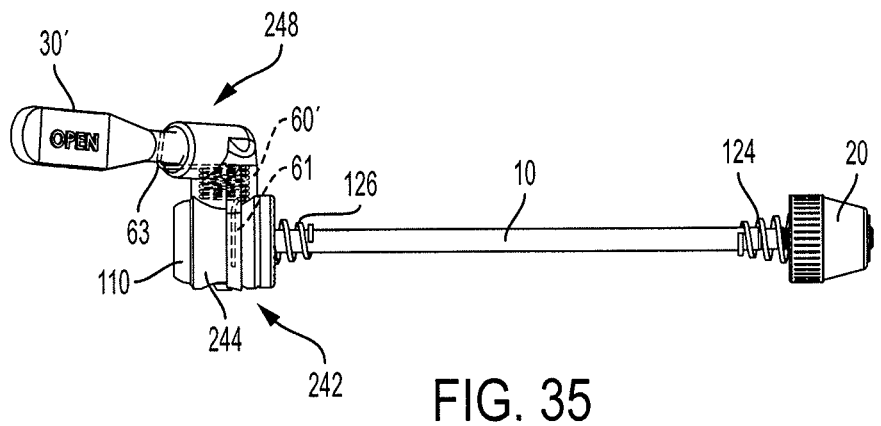
FIG. 35 is a bottom view of the embodiment of FIG. 34.

As can be best seen in FIGS. 25 and 26 the body portion 248 can have a neck portion or projection 249 that projects outwardly at the desired bias rest position angle from a base portion 251 of body portion 248. In addition, body portion 248 can define an internal passageway 253 (FIG. 23) shaped and sized to receive the portion of the lever from which a pivot or shank portion of the lever that engages cap 110 projects. Passageway 253 in this example communicates from the neck opening to a cap receiving chamber 257 surround by an annular wall 259 of body 244 within which cap 110 can be positioned.

The elastomeric coupler of FIGS. 23-26 can be molded; making it easy to produce.

In yet another embodiment, the biasing member can comprise a combination of a spring mechanism and an elastomeric mechanism (See e.g., FIGS. 32-35). For example, the elastomeric member of FIGS. 23-26 can be utilized in the embodiment of FIGS. 6-9 with the opening 250 and passageway 253 being sized to accommodate the spring 60" and that portion of the spring 63 that engages the lever 30'. In the event a combined spring and elastomeric biasing member is used, the combined torsional biasing forces can be in the ranges as described above in the spring biasing member example.

FIGS. 27-29 illustrate a quick release assembly in accordance with an embodiment of this disclosure mounted to the respective forks 280, 282 of a portion of a bicycle frame. Quick releases in accordance with this disclosure can be used to couple front or rear wheels (or both) to a bicycle frame.

Having illustrated and described the principles of these developments with reference to a number of embodiments, it should be apparent to those of ordinary skill in the art that these embodiments may be modified in arrangement and detail without departing from the inventive principles disclosed therein. I claim all such modifications as being within the scope of this disclosure.

I claim:

1. A quick release skewer assembly for use in mounting a wheel to a wheel supporting fork, the quick release skewer assembly comprising:
   a lever having first and second lever end portions;
   a skewer having first and second skewer end portions;
   the first lever end portion being pivoted to the first skewer end portion such that the lever is pivotal relative to the skewer about a lever pivot axis between closed and open positions;
   a biasing member coupled to the lever and to the skewer and applying a biasing force that biases the lever toward a bias rest position between the closed and open positions;
   a tensioning nut coupled to the second skewer end portion, the tensioning nut being movable axially along the length of the skewer to: (a) at least one clamping position that establishes a first distance between the tensioning nut and the first lever end portion; and (b) at least one loose position that establishes a second distance between the tensioning nut and the first lever end portion;
   wherein pivoting the lever to the closed position with the tensioning nut in the at least one clamping position clamps the wheel to the wheel supporting fork with a clamping force that is greater than the biasing force retains the lever in the closed while still allowing pivoting of the lever toward the open position by applying a force that, when added to the biasing force, is greater than the clamping force; and
   wherein pivoting the lever to the closed position with the tensioning nut in the at least one loose position applies a clamping force that is less than the biasing force and the lever is moved by the biasing force to a bias rest position that is between the lever closed and lever open positions.

2. The quick release assembly according to claim 1 wherein the bias rest position is closer to the closed position than the open position.

3. The quick release mechanism according to claim 1 wherein the bias rest position is in the range of thirty degrees to sixty five degrees from the closed position in the absence of a clamping force.

4. The quick release assembly according to claim 1 wherein the bias rest position is within sixty five degrees of the position midrange between the closed position and the open position.

5. The quick release assembly according to claim 1 wherein the biasing member comprises a spring, or an elastomeric member, or a combination of a spring and an elastomeric member.

6. The quick release assembly according to claim 1 wherein the biasing member comprises a spring that provides a spring torque required to rotate the lever toward the open position from the bias rest position that is greater than the spring torque required to rotate the lever from the bias rest position toward the closed position.

7. The quick release assembly according to claim 1 including a cap coupled to the first end of the skewer, the first end of lever comprises a lever shank portion inserted through the cap and first end portion of the skewer, the shank and thereby the lever being pivotal about the lever pivot axis, the biasing member comprising a coil spring with coils surrounding the lever pivot axis and with a first spring end portion coupled to the lever and a second spring end portion coupled to the cap.

8. The quick release assembly according to claim 7 wherein the biasing member further comprises an elastomeric member with a body having a cap receiving opening into which the cap is inserted and a neck portion with a neck opening surrounding a portion of the lever.

9. The quick release assembly according to claim 1 wherein the biasing member comprises an elastomeric member with a body having a first opening into which at least a portion of the first end portion of the skewer is inserted and a neck portion with a neck opening surrounding a portion of the lever.

10. The quick release assembly according to claim 1 wherein the biasing member applies a biasing force that is from 0.005 to 0.200 in-lbs of torque per degree of rotation.

11. The quick release assembly according to claim 1 wherein the bias rest position is in the range of thirty degrees to sixty five degrees from the closed position in the absence of a clamping force and wherein the biasing member applies a biasing force that is from 0.005 to 0.200 in-lbs of torque per degree of rotation.

12. A quick release skewer assembly for use in mounting a wheel to wheel supporting fork, the quick release skewer assembly comprising:
   a lever having first and second lever end portions;
   a skewer having first and second skewer end portions;
   the first lever end portion being pivoted to the first skewer end portion such that the lever is pivotal relative to the skewer about a lever pivot axis between closed and open positions; and
   a biasing member coupled to the lever and to the skewer and applying a biasing force that biases the lever toward a bias rest position between the closed and open positions, the biasing member comprising at least one of a spring and an elastomeric member, the biasing member moving the lever relative to the skewer to the bias rest position in the absence of an opposing force that is greater than the biasing force.

13. The quick release assembly according to claim 12 wherein the bias rest position is closer to the closed position than the open position.

14. The quick release mechanism according to claim 12 wherein the bias rest position is in the range of thirty degrees to sixty five degrees from the closed position in the absence of an opposing force.

15. The quick release assembly according to claim 12 wherein the biasing member comprises a spring, or an elastomeric member, or a combination of a spring and an elastomeric member.

16. The quick release assembly according to claim 15 including a cap coupled to the first end of the skewer, the first end of lever comprises a lever shank portion inserted through the cap and the first end portion of the skewer, the shank and thereby the lever being pivotal about the lever pivot axis, the biasing member comprising a coil spring with coils surrounding the lever pivot axis and with a first spring end portion coupled to the lever and a second spring end portion coupled to the cap.

17. The quick release assembly according to claim 16 wherein the biasing member further comprises an elastomeric member with a body having a cap receiving opening into which the cap is inserted and a neck portion with a neck opening surrounding a portion of the lever.

18. The quick release assembly according to claim 15 wherein the biasing member comprises an elastomeric member with a body having a first opening into which at least a portion of the first end portion of the skewer is inserted and a neck portion with a neck opening surrounding a portion of the lever.

19. The quick release assembly according to claim 11 wherein the biasing member applies a biasing force that is from 0.005 to 0.200 in-lbs of torque per degree of rotation.

* * * * *